US008613268B2

(12) United States Patent
Chevalier

(10) Patent No.: US 8,613,268 B2
(45) Date of Patent: Dec. 24, 2013

(54) METHOD AND APPARATUS FOR SECURING A BALANCER SHAFT MODULE

(75) Inventor: Steven Joseph Chevalier, Britton, MI (US)

(73) Assignee: Metaldyne LLC, Plymouth, MI (US)

(*) Notice: Subject to any disclaimer, the term of this patent is extended or adjusted under 35 U.S.C. 154(b) by 484 days.

(21) Appl. No.: 12/913,248

(22) Filed: Oct. 27, 2010

(65) Prior Publication Data

US 2011/0094469 A1    Apr. 28, 2011

Related U.S. Application Data

(60) Provisional application No. 61/255,337, filed on Oct. 27, 2009.

(51) Int. Cl.
*F02B 75/06* (2006.01)

(52) U.S. Cl.
USPC .......... 123/192.2; 123/192.1; 74/603; 74/604

(58) Field of Classification Search
USPC ............... 123/192.1, 192.2; 74/603, 604; 29/888.01
See application file for complete search history.

(56) References Cited

U.S. PATENT DOCUMENTS

| 2,014,838 | A | * | 9/1935 | Edwards | 73/487 |
| 4,425,821 | A | * | 1/1984 | West | 74/604 |
| 4,665,766 | A | * | 5/1987 | Umeha et al. | 74/567 |
| 5,960,761 | A | | 10/1999 | Kawakubo et al. | |
| 6,598,941 | B2 | * | 7/2003 | Field et al. | 301/35.621 |
| 2004/0154575 | A1 | | 8/2004 | Hiraki et al. | |
| 2007/0012130 | A1 | | 1/2007 | Chevalier et al. | |
| 2009/0050088 | A1 | | 2/2009 | Schafer et al. | |

OTHER PUBLICATIONS

International Search Report for International Application No. PCT/US2010/054308; Date of Mailing Jul. 27, 2011.
Written Opinion for International Application No. PCT/US2010/054308; Date of Mailing Jul. 27, 2011.

* cited by examiner

*Primary Examiner* — Noah Kamen
*Assistant Examiner* — Grant Moubry
(74) *Attorney, Agent, or Firm* — McDonald Hopkins LLC

(57) ABSTRACT

A method for securing a balancer shaft module to an engine is provided, the method including the steps of passing a mounting feature into at least two mounting apertures of the balancer shaft module; simultaneously rotating two of the mounting features within the mounting aperture, wherein the simultaneous rotation of the two mounting features laterally moves the balancer shaft module with respect to the engine; and securing the balancer shaft module to the engine. In addition, a mounting feature for securing a balancer shaft module to an engine is provided, the mounting feature having: a top portion; a mounting cylinder secured to the top portion, the mounting cylinder being centrally located on the top portion; a securement opening passing through the top portion and the mounting cylinder; and wherein the mounting cylinder has a non-uniform outer wall such that a center of the securement opening is offset from a center of the top portion such that rotation of the top portion rotates the securement opening about the center of top portion.

19 Claims, 5 Drawing Sheets

METHOD AND APPARATUS FOR SECURING A BALANCER SHAFT MODULE

CROSS-REFERENCE TO RELATED APPLICATIONS

This application claims the benefit of U.S. Provisional Patent Application Ser. No. 61/255,337 filed Oct. 27, 2009, the contents of which are incorporated herein by reference thereto.

BACKGROUND

Exemplary embodiments of the present invention relate to a method and apparatus for securing a first component to another component.

Reference is made to the following U.S. Pat. Nos. 6,170, 453; 6,237,442; and 6,682,437 the contents each of which are incorporated herein by reference thereto.

Balancer shaft modules include a plurality of gears wherein at least one of the plurality of gears must be engaged with a complementary gear of an engine the balancer shaft it is secured to. In the past and in order to obtain desired backlash ranges between the gears of the balancer shaft module and the engine, select fitting processes or shimming processes are used. These processes are costly and time-consuming.

Accordingly, it is desirable to provide a method of securement wherein gear backlash is controlled.

SUMMARY OF THE INVENTION

In accordance with an exemplary embodiment of the invention, a method for securing a balancer shaft module to an engine is provided, the method including the steps of passing a mounting feature into at least two mounting apertures of the balancer shaft module; simultaneously rotating the mounting features within a respective mounting aperture, wherein the rotation of the mounting features laterally moves the balancer shaft module with respect to a mounting surface; and securing the balancer shaft module to the mounting surface, when it is in the desired position.

In another exemplary embodiment, a mounting feature for securing a balancer shaft module to an engine is provided, the mounting feature having: a top portion; a mounting cylinder secured to the top portion, the mounting cylinder being centrally located on the top portion; a securement opening passing through the top portion and the mounting cylinder; and wherein the mounting cylinder has a non-uniform outer wall such that a center of the securement opening is offset from a center of the top portion such that rotation of the top portion rotates the securement opening about the center of top portion.

In another exemplary embodiment, a mounting feature for securing a balancer shaft module to an engine is provided, the mounting feature having: a top portion; a mounting cylinder secured to and extending away from the top portion, the mounting cylinder being centrally located on the top portion; and a securement opening passing through the top portion and the mounting cylinder, wherein the securement opening is offset from a center of the mounting cylinder and the top portion, wherein rotation of the top portion rotates the securement opening about a center of the top portion.

In another embodiment, a pair of mounting features in combination with a balancer shaft module and a mounting surface of an engine is provided. The combination having: a pair of openings located in the balancer shaft module; a pair of openings located in the mounting surface, wherein each of the pair of openings of the mounting surface have a shoulder portion and a threaded inner surface; each of the pair of mounting features having: a top portion; a mounting cylinder secured to and extending away from the top portion, the mounting cylinder being centrally located on the top portion and configured to be received within the pair of openings of the balancer shaft module; and a securement opening passing through the top portion and the mounting cylinder, wherein the securement opening is offset from a center of the mounting cylinder and the top portion, wherein rotation of the top portion rotates the securement opening about a center of the top portion.

Additional features and advantages of the various aspects of exemplary embodiments of the present invention will become more readily apparent from the following detailed description in conjunction with the drawings wherein like reference numerals refer to corresponding parts in the several views.

Figure 1:
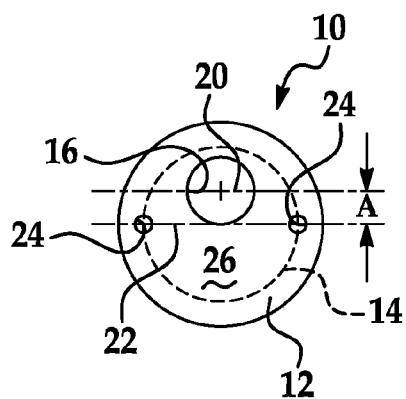
FIG. 1 is a top plane view of an exemplary embodiment of the present invention.

Although the drawings represent varied embodiments and features of the present invention, the drawings are not necessarily to scale and certain features may be exaggerated in order to illustrate and explain exemplary embodiments of the present invention. The exemplification set forth herein illustrates several aspects of the invention, in one form, and such exemplification is not to be construed as limiting the scope of the invention in any manner.

DETAILED DESCRIPTION OF EXEMPLARY EMBODIMENTS

Referring now to the drawings various embodiments of the present invention are illustrated. In accordance with exemplary embodiments of the present invention a method and apparatus for securing a balancer shaft module to an engine is provided.

In one embodiment a pair of mounting features are provided such that the module's position relative to the crank shaft can be adjusted to maintain a fixed backlash. Exemplary embodiments of the present invention eliminate the need for select fitting of the component or shimming to achieve desired backlash ranges.

In accordance with an exemplary embodiment and by using synchronized assembly equipment that simultaneously engages and rotates a pair of mounting features, the module's lateral position can be adjusted to optimize the backlash on a gear drive system while maintaining axis alignment. In one embodiment, the synchronized assembly equipment comprises a robot or any other equivalent device or mechanism that is configured to have a tool or arm configured to simultaneously engage and rotate the pair of mounting features.

Figure 2:
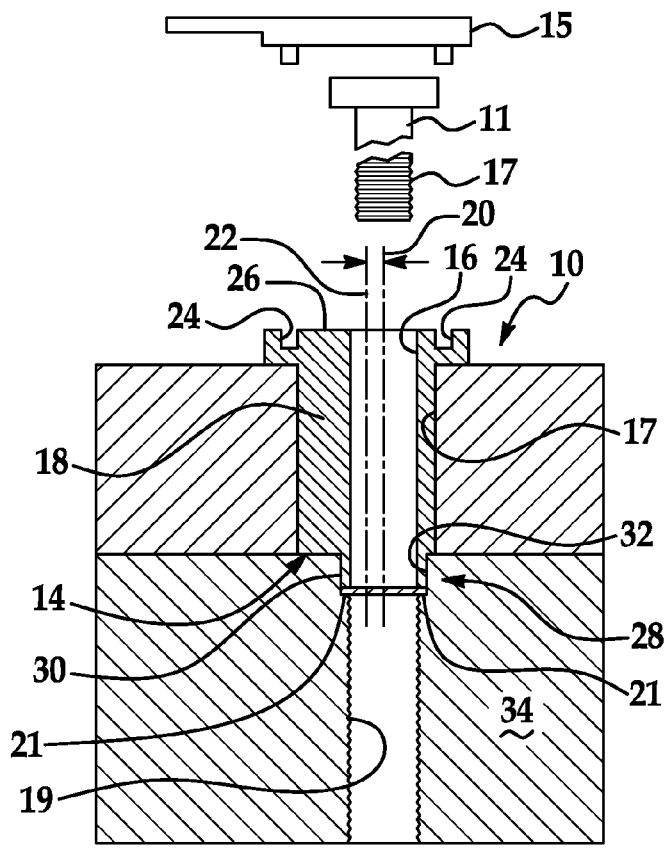
FIG. 2 is a cross-sectional view of a balancer shaft module secured to a surface with a mounting feature inserted into the balancer shaft module and extending into the mounting surface in accordance with an exemplary embodiment of the present invention.

Referring now to the FIGS. and in particular FIGS. 1 and 2, a mounting feature or eccentric cam 10 for securing a balancer shaft module to an engine in accordance with an exemplary embodiment is illustrated. The mounting feature or eccentric cam has a top portion 12 and a mounting cylinder or column 14 secured to and extending from the top portion. The mounting cylinder is centrally located on the top portion such that portions of the top portion extend away from an exterior surface of the mounting cylinder. The mounting feature or eccentric cam also has a securement opening 16 passing completely through the top portion and the mounting cylinder. The securement opening is configured for receipt of a bolt 11 that secures the module to an engine while also passing through the securement feature.

As illustrated in at least FIG. 2, the mounting cylinder is rotatably received in an opening 17 of the balancer shaft module. In addition, the mounting cylinder has a non-uniform outer wall 18 that forms the mounting cylinder such that a center 20 of the securement opening passing through the mounting cylinder is offset from a center 22 of the top portion and the mounting cylinder such that rotation of the top portion will cause the securement opening to rotate about the center of top portion. In other words, as top portion 12 rotates the mounting cylinder rotates in an eccentric fashion. Furthermore and as illustrated in FIG. 1, rotation of the top portion about the center of opening 16 causes the outer wall of the mounting cylinder to rotate about the center of the securement opening in an eccentric fashion such that the outer wall of the mounting cylinder acts like a cam surface against the inner surface of opening 17. As illustrated, the center of opening 16 is offset from the center of the top portion by distance "A".

In order to rotate the mounting feature, the top portion has a plurality of features 24 for engaging a tool 15 in order to rotate the top portion. In one embodiment, the features are openings 24 in a surface 26 of top portion 12. Of course other features such as protrusions, notches, etc. and equivalents thereof are contemplated. Still further and in other embodiments, the top portion 12 may be configured as a bolt head that is engaged by a wrench or other equivalent tool. As discussed above, tool 15 may be secured to a distal end of a robot or other synchronized assembly device such that each of the pair of mounting features can be simultaneously rotated.

In addition, a distal end 28 of the mounting cylinder has a shoulder portion or extended portion 30 that extends from outer wall 18 and is centrally aligned with securement opening 16 and has a uniform outer wall. As illustrated, the shoulder portion or extended portion has a smaller diameter than the diameter of the mounting cylinder and is centrally aligned with the center of securement opening 16. Accordingly, the extended portion is configured to be rotatably received within a mounting opening 32 of a mounting surface 34 the module is to be secured to such that rotation of the mounting feature linearly moves the module with respect to the mounting surface. In other words, portion 30 rotates within opening 32, which in turn causes eccentric movement of outer wall 18 of the mounting cylinder that is received within the module housing and thus causes linear movement of the module housing with respect to the mounting surface as the feature is rotated. Thereafter and once the desired position is achieved, the module is secured to the surface by passing bolts through the mounting features and securing them to the mounting surface.

Figure 3:
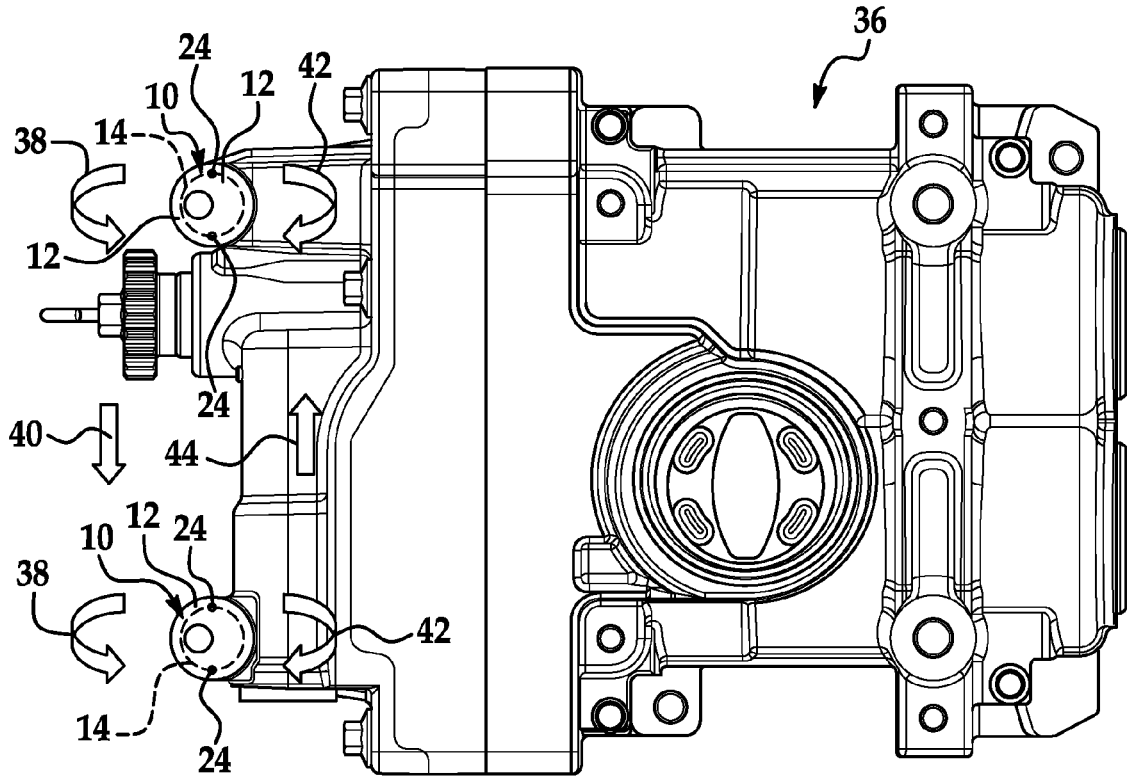
FIG. 3 is bottom view of a balancer shaft module with the mounting features inserted therein in accordance with an exemplary embodiment of the present invention.

FIG. 3 is a bottom view of a balancer shaft module 36 illustrating mounting features 10 secured thereto and extending into the mounting opening of the mounting surface. As illustrated and in accordance with an exemplary embodiment of the present invention, a pair of mounting features are utilized and each of the pair of mounting features are simultaneously rotated after they are inserted into a corresponding mounting aperture in the same orientation with respect to each other. Accordingly, the mounting cylinder of each mounting feature is in the same orientation with respect to each other prior to the simultaneous rotation thereof in order to achieve the desired linear movement. In other words each mounting feature should be orientated such that simultaneous movement thereof will not cause one feature to counter act the other.

As illustrated, simultaneous rotation of the mounting features in the direction of arrows 38 from the illustrated position of the mounting features 10 will cause corresponding linear translation of the balancer shaft module 36 in the direction of arrow 44 with respect to the mounting surface. Similarly, simultaneous rotation of the mounting features in the direction of arrows 42 from the illustrated position in the FIG. 3 will cause a corresponding linear translation of the balancer shaft module in the direction of arrow 40. This is due to the offsetting of the securement opening 16 with respect to the center of the top portion 12 as well as the center of wall portion or cylinder 18 opening 16 is formed in.

Figure 4:
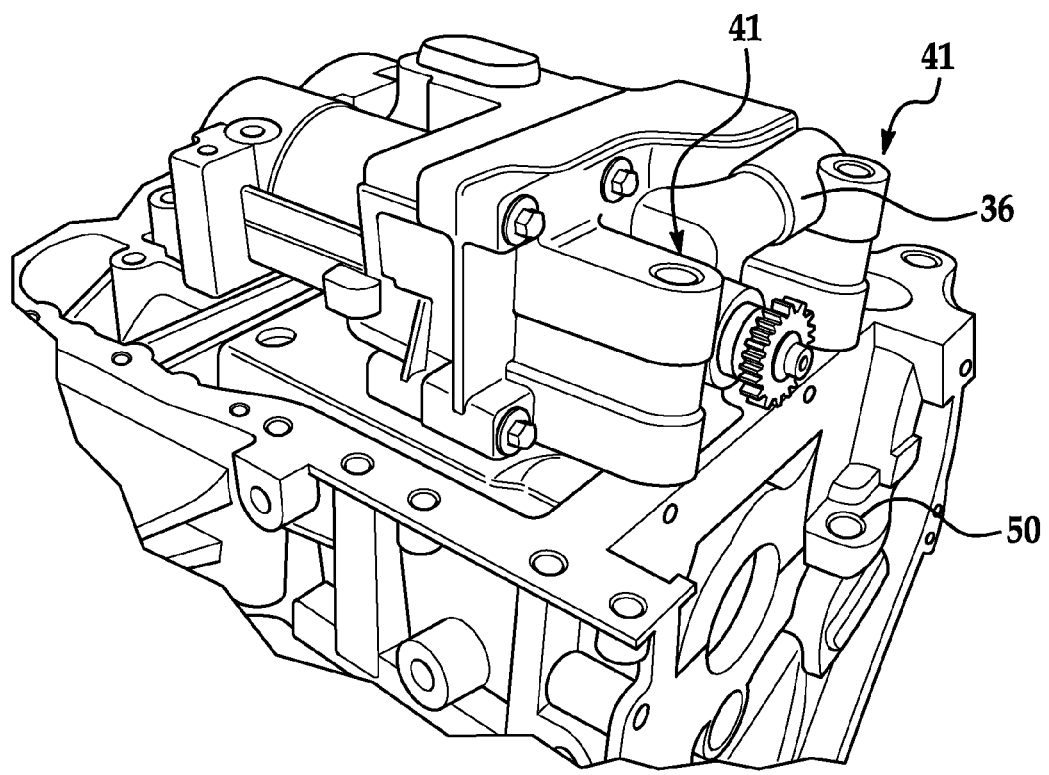
FIG. 4 is perspective view illustrating the balancer shaft module secured to an engine.

Once the position of the module has been adjusted through rotation of the pair of mounting features 10 by a synchronized assembly process, and the desired backlash range has been achieved, a bolt 11 is passed through each securement opening and is secured to the mounting surface such that the module is fixedly secured to its mounting surface for example, an engine 50 as illustrated in FIG. 4.

In one embodiment, the bolt has a threaded portion 17 that engages a complimentary threaded surface 19 in the opening 32 in the mounting surface. As illustrated in FIG. 2, opening 32 has a step 21 such that its inner diameter is reduced where threads 19 begin and the height or portion 30 from mounting cylinder 14 is configured such that portion 30 terminates at step 21 where the inner diameter of opening 32 is reduced. Accordingly and as bolt 11 passes through the opening 16 and rotated, the threads 17 of the bolt 11 will engage corresponding threads 19 of opening 32 thus securing the module to the mounting surface or engine.

Figure 5:
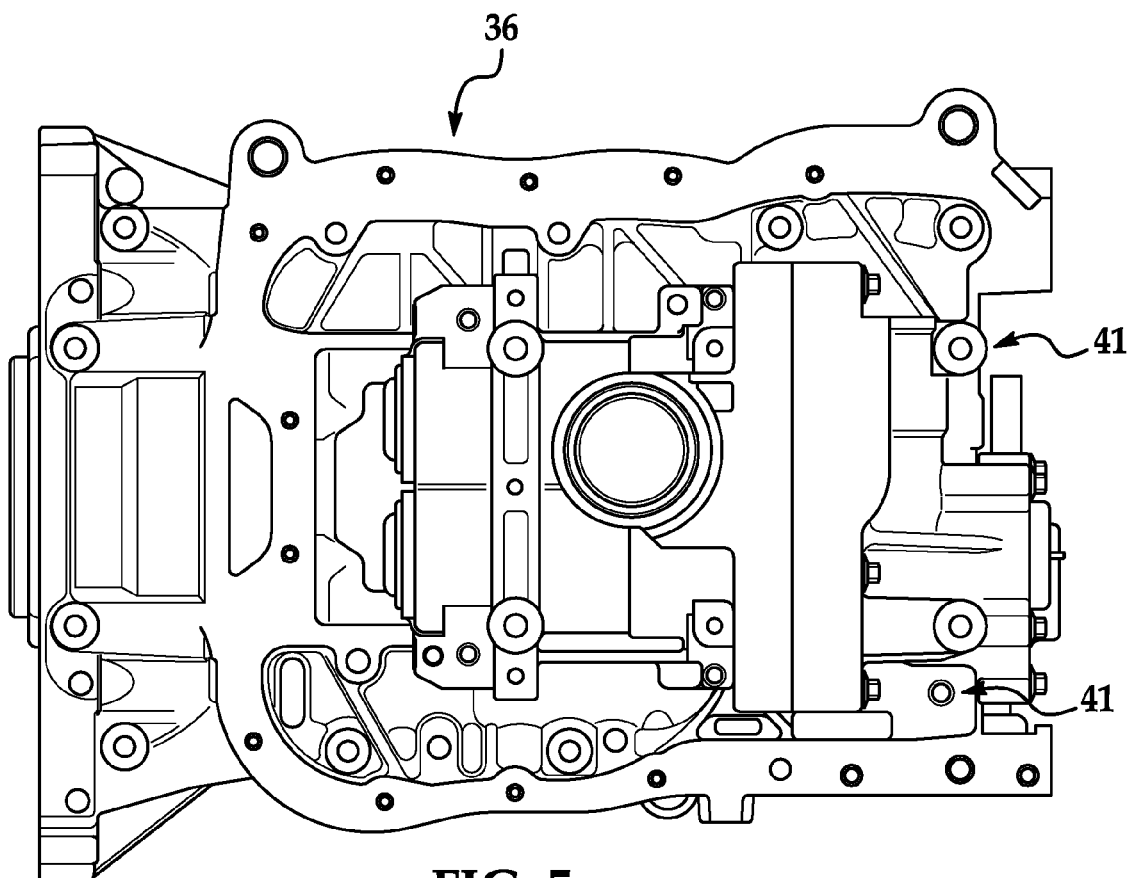
FIG. 5 is bottom view of a balancer shaft module illustrating locations for the mounting features in accordance with an exemplary embodiment of the present invention.

FIG. 5 illustrates other possible locations 51 for application of the mounting features having the offset or eccentric columns inserted therein wherein simultaneous rotation of the same will cause linear movement of the module with respect to its mounting surface.

Figure 6:
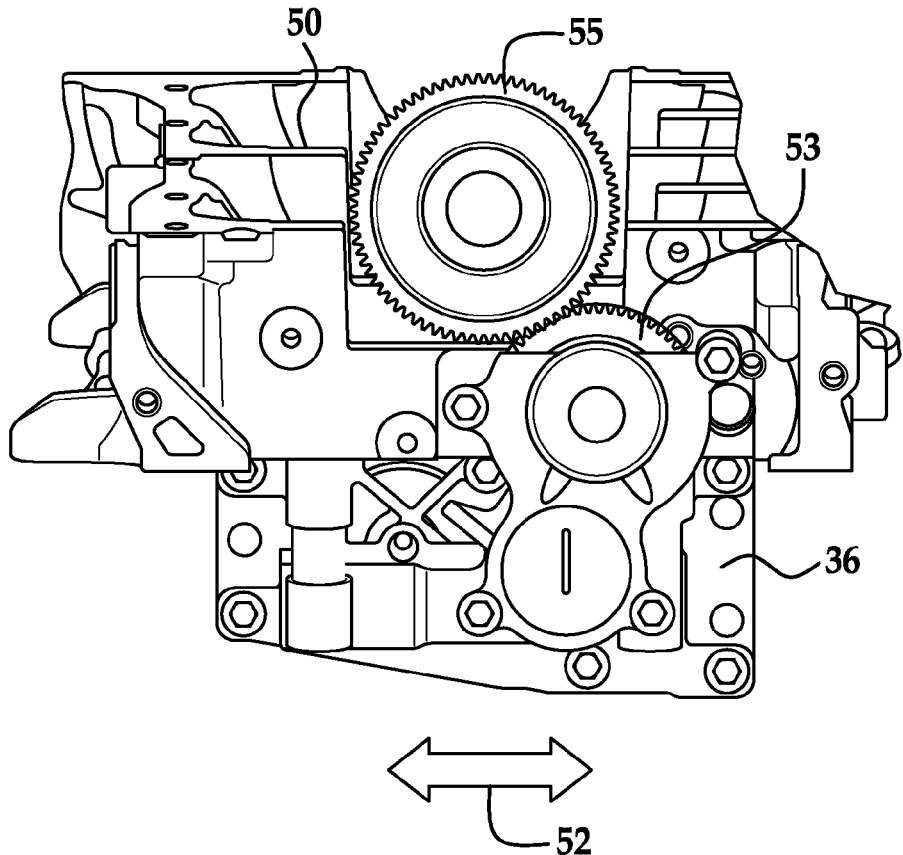
FIG. 6 is end view of a balancer shaft module secured to an engine block.

FIG. 6 is an end view of a balancer shaft module secured to an engine wherein lateral movement is illustrated by arrow 52. In accordance with an exemplary embodiment of the present invention and by moving the module left and right or in the directions of arrow 52 via the eccentric columns, backlash can be optimized between an immediate gear 53 and a crankshaft gear 55.

Figure 7:
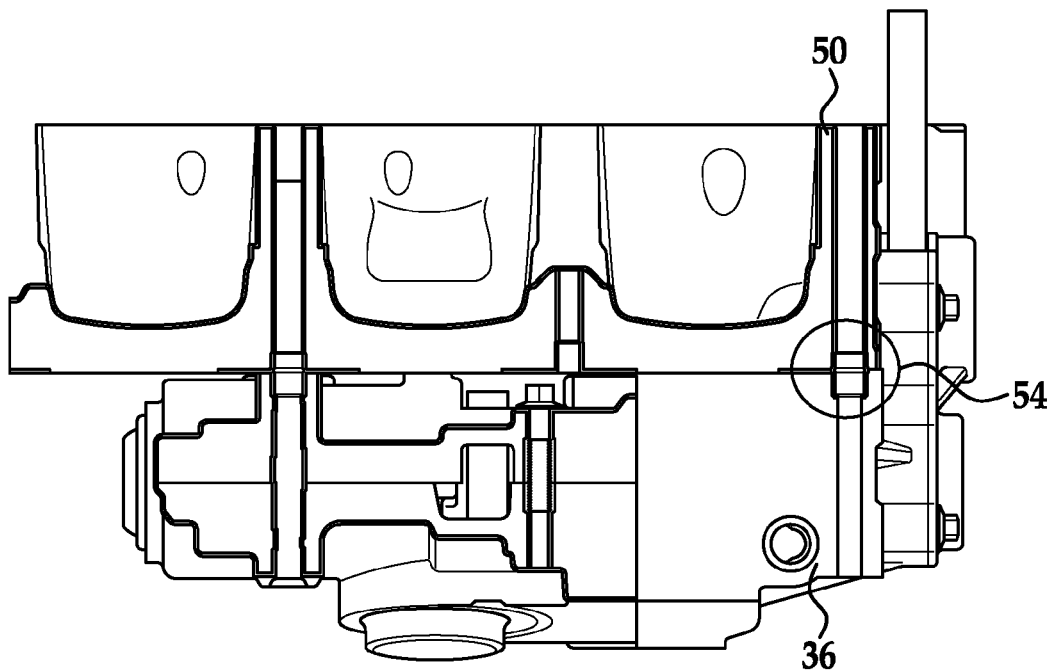
FIG. 7 is cross section view of a balancer shaft module secured to an engine block.
Figure 8:
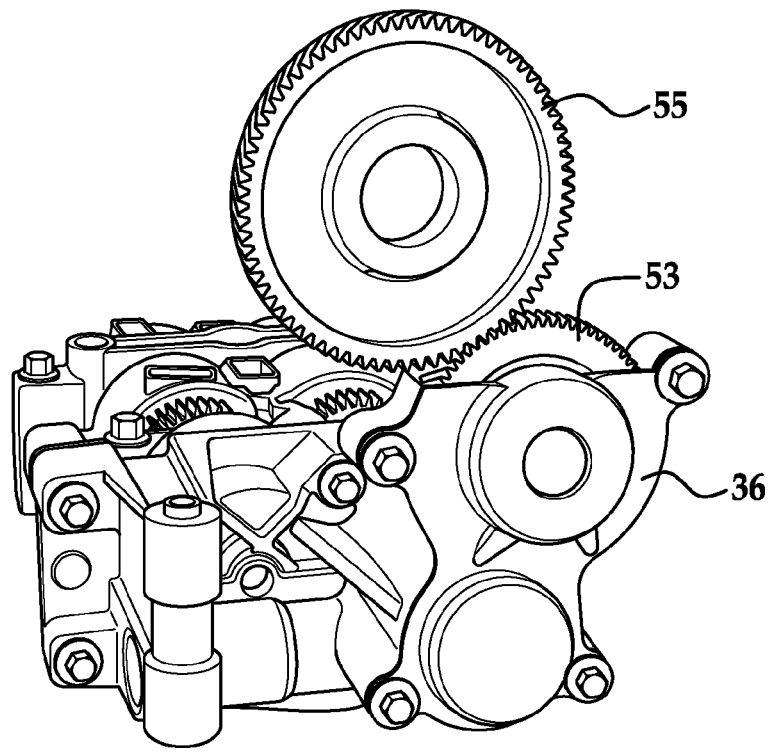
FIG. 8 is a view of a balancer shaft module.
Figure 9A:
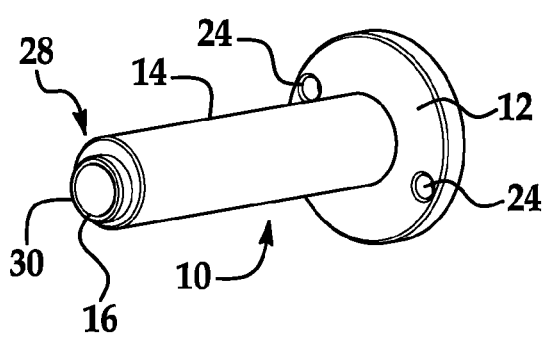
FIGS. 9A-9C are views of eccentric cams or mounting features in accordance with an exemplary embodiment of the invention.
Figure 9B:
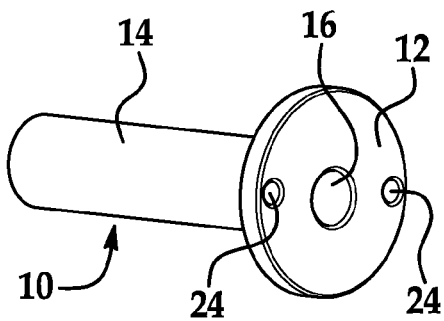
Figure 9C:
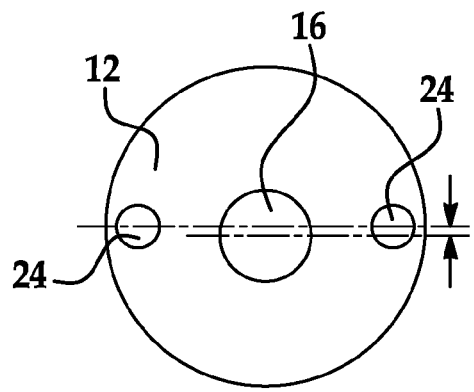
Figure 10A:
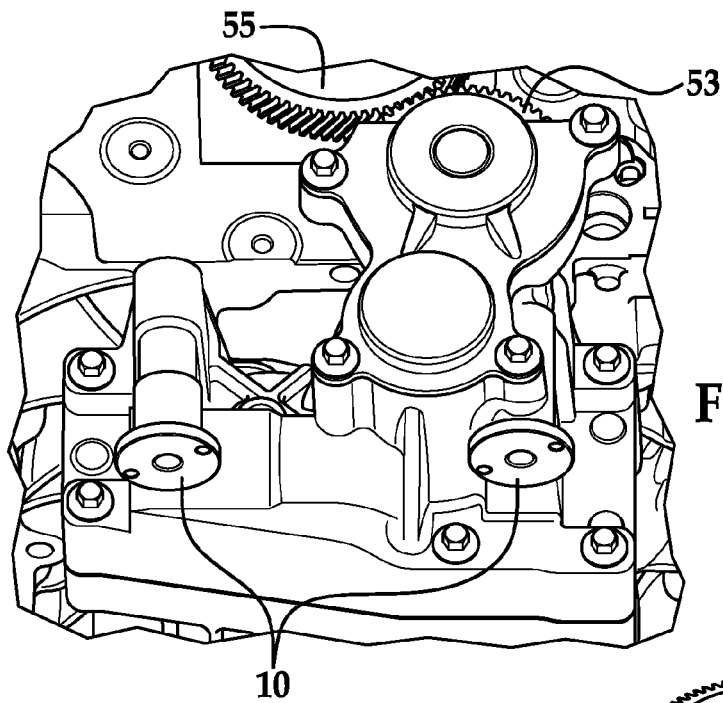
FIGS. 10A-10B are views illustrating a balancer shaft module secured to an engine in accordance with an exemplary embodiment of the present invention.
Figure 10B:
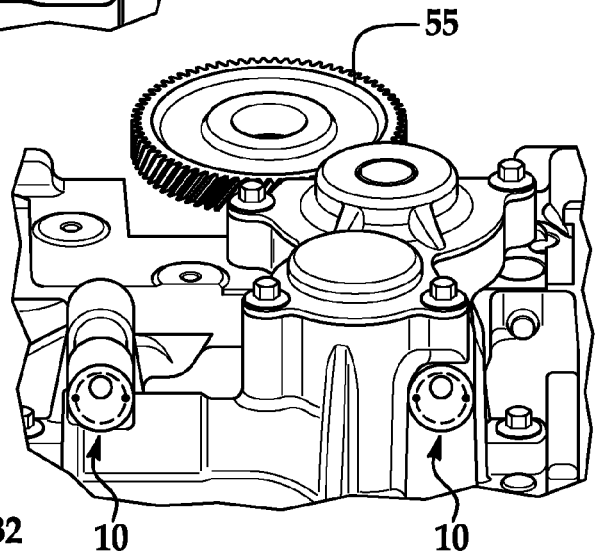
Figure 11:
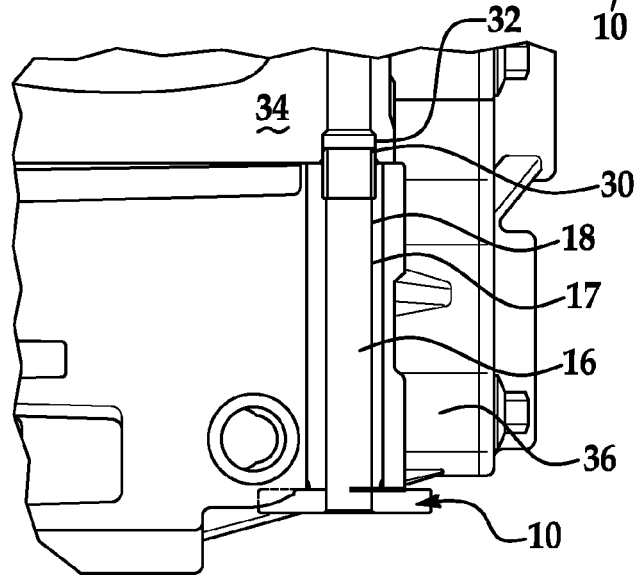
FIG. 11 is cross section view of a balancer shaft module secured to an engine with an exemplary embodiment of the present invention.

FIG. 7 is a cross-sectional view of a balancer shaft module secured to an engine illustrating a pivot point 54 wherein the shoulder portion or extended portion 30 of the mounting cylinder is rotatably received within an opening 32 of the mounting surface 34.

As used herein, the terms "first," "second," and the like, herein do not denote any order, quantity, or importance, but rather are used to distinguish one element from another, and the terms "a" and "an" herein do not denote a limitation of quantity, but rather denote the presence of at least one of the referenced item. In addition, it is noted that the terms "bottom" and "top" are used herein, unless otherwise noted, merely for convenience of description, and are not limited to any one position or spatial orientation.

The modifier "about" used in connection with a quantity is inclusive of the stated value and has the meaning dictated by the context (e.g., includes the degree of error associated with measurement of the particular quantity).

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for securing a balancer shaft module to an engine, comprising:
    passing a mounting feature into at least two mounting apertures of the balancer shaft module and at least two mounting apertures of a mounting surface the balancer shaft module is to be secured to;
    simultaneously rotating the mounting feature within at least two mounting apertures, wherein the simultaneous rotation of the mounting feature laterally moves the balancer shaft module with respect to the mounting surface; and
    securing the balancer shaft module to the mounting surface.

2. The method as in claim 1, wherein the securing step further comprises inserting a mounting bolt into the feature and threadingly engaging a threaded surface of the at least two mounting apertures of the mounting surface.

3. The method as in claim 1, wherein each mounting feature comprises:
    a top portion;
    a mounting cylinder secured to the top portion, the mounting cylinder being centrally located on the top portion;
    a securement opening passing through the top portion and the mounting cylinder, wherein the mounting cylinder has a non-uniform outer wall with respect to the securement opening such that a center of the securement opening is offset from a center of the top portion and rotation of the top portion rotates the non-uniform outer wall about the center of top portion.

4. The method as in claim 3, wherein the top portion has a plurality of features for engaging a tool in order to rotate the top portion.

5. The method as in claim 3, wherein the top portion is cylindrical in shape.

6. The method as in claim 3, wherein the plurality of features are openings in a surface of top portion.

7. The method as in claim 1, wherein each mounting feature comprises:
    a top portion;
    a mounting cylinder secured to the top portion and extending therefrom, the mounting cylinder being centrally located on the top portion such that the top portion extends outwardly from the mounting cylinder;
    an extended portion that extends from the mounting cylinder and having a smaller diameter than that of the mounting cylinder, wherein the extended portion is configured to be rotationally received in the aperture of the mounting surface.

8. The method as in claim 7, wherein the outer periphery of the mounting cylinder is greater than an inner diameter of the aperture of the mounting surface.

9. The method as in claim 7, wherein each mounting feature is inserted into each mounting aperture in the same orientation such that the mounting cylinder of each mounting feature is in the same orientation with respect to each other prior to the simultaneous rotation thereof.

10. A mounting feature for securing a balancer shaft module to an engine, the mounting feature comprising:
    a top portion;
    a mounting cylinder secured to and extending away from the top portion, the mounting cylinder being centrally located on the top portion;
    a securement opening passing through the top portion and the mounting cylinder, wherein the securement opening is offset from a center of the mounting cylinder and the top portion, wherein rotation of the top portion rotates the securement opening about a center of the top portion; and
    wherein the top portion includes one or more features for engaging a tool in order to rotate the top portion.

11. The mounting feature as in claim 10, wherein the top portion is cylindrical in shape.

12. The mounting feature as in claim 10, wherein the plurality of features are openings in a surface of the top portion.

13. The mounting feature as in claim 10, wherein the top portion extends outwardly from an exterior surface of the mounting cylinder; and an extended portion extends from a distal end of the mounting cylinder, the extended portion having a smaller diameter than that of the mounting cylinder.

14. The mounting feature as in claim 13, wherein the top portion has a plurality of features for engaging a tool in order to rotate the top portion.

15. The mounting feature as in claim 13, wherein the top portion is circular in shape.

16. The mounting feature as in claim 14, wherein the plurality of features are openings in a surface of top portion.

17. A pair of mounting features in combination with a balancer shaft module and a mounting surface of an engine, comprising:
    a pair of openings located in the balancer shaft module;
    a pair of openings located in the mounting surface, wherein each of the pair of openings of the mounting surface have a shoulder portion and a threaded inner surface;
    each of the pair of mounting features having:
        a top portion;
        a mounting cylinder secured to and extending away from the top portion, the mounting cylinder being centrally located on the top portion and configured to be received within the pair of openings of the balancer shaft module; and
        a securement opening passing through the top portion and the mounting cylinder, wherein the securement opening is offset from a center of the mounting cylinder and the top portion, wherein rotation of the top portion rotates the securement opening about a center of the top portion.

18. The mounting feature as in claim 17, wherein the top portion has a plurality of features for engaging a tool in order to rotate the top portion.

19. The mounting feature as in claim 18, wherein the top portion extends outwardly from an exterior surface of the mounting cylinder; and an extended portion extends from a distal end of the mounting cylinder, the extended portion having a smaller diameter than that of the mounting cylinder.

* * * * *